(12) United States Patent
Bartels

(10) Patent No.: US 6,177,054 B1
(45) Date of Patent: Jan. 23, 2001

(54) HIGH PRESSURE REACTOR REINFORCED WITH FIBERS EMBEDDED IN A POLYMERIC OR RESINOUS MATRIX

(75) Inventor: Paul Vincent Bartels, Wageningen (NL)

(73) Assignee: Instituut Voor Agrotechnologisch Onderzoek (ATO-DLO) (NL)

( * ) Notice: Under 35 U.S.C. 154(b), the term of this patent shall be extended for 0 days.

(21) Appl. No.: 08/970,467

(22) Filed: Nov. 14, 1997

(30) Foreign Application Priority Data

Nov. 14, 1996 (EP) .............................. 96 203 187

(51) Int. Cl.⁷ .................... B01J 3/00; B01J 19/00
(52) U.S. Cl. ..................... 422/240; 422/241; 422/242
(58) Field of Search ..................... 422/241, 240, 422/242; 220/590; 100/208, 178, 73, 302, 177

(56) References Cited

U.S. PATENT DOCUMENTS

| | | | |
|---|---|---|---|
| 3,649,208 | * 3/1972 | Hornschuch | 422/134 |
| 3,992,912 | * 11/1976 | Jonsson | 72/54 |
| 4,288,406 | * 9/1981 | Sims, Jr. | 422/131 |
| 4,357,305 | * 11/1982 | Loo | 422/241 |
| 4,699,288 | * 10/1987 | Mohan | 220/590 |
| 4,835,975 | 6/1989 | Windecker | 62/45.1 |
| 5,018,638 | * 5/1991 | Auberon et al. | 220/414 |
| 5,236,669 | * 8/1993 | Simmons et al. | 422/113 |
| 5,284,996 | * 2/1994 | Vickers | 588/249 |
| 5,287,988 | * 2/1994 | Murray | 220/589 |
| 5,555,678 | * 9/1996 | Schoo | 52/2.13 |

FOREIGN PATENT DOCUMENTS

| | | |
|---|---|---|
| 0464202 | 1/1990 | (EP) . |
| 791099 | 3/1956 | (GB) . |
| WO 9412396 | 6/1994 | (WO) . |
| WO 9521690 | 8/1995 | (WO) . |

* cited by examiner

Primary Examiner—Marian C. Knode
Assistant Examiner—Susan Ohorodnik
(74) Attorney, Agent, or Firm—Webb Ziesenheim Logsdon Orkin & Hanson, P.C.

(57) ABSTRACT

A reactor vessel comprising
(a) a cylindrically shaped, hollow core element as the inner wall, which element is open at both ends; and
(b) at least one layer of high performance fibers, preferably having a tensile strength of at least 100 MPa, arranged around the core element in an essentially circumferential orientation,
wherein the fibers are embedded in a rigid polymeric or resinous matrix. The reactor vessel is suitably part of a high pressure reactor, which further includes two plugging elements arranged in the opposing open ends of the vessel, which plugging elements are mounted on a common frame for balancing the forces exerted on the plugging elements. The reactor is very suitable for use in high pressure operations.

15 Claims, 1 Drawing Sheet

HIGH PRESSURE REACTOR REINFORCED WITH FIBERS EMBEDDED IN A POLYMERIC OR RESINOUS MATRIX

BACKGROUND OF THE INVENTION

The present invention relates to a reactor vessel, to a high pressure reactor comprising such vessel, to a high pressure reactor system comprising two or more of these high pressure reactors, to a process for manufacturing the reactor vessels and to the use of these high pressure reactors and reactor systems in operations requiring high pressures.

High pressure reactors are known in the art. They usually comprise a cylindrically-shaped stainless steel vessel of sufficient thickness to withstand the radial forces caused by the high pressures applied and one or two pistons elements, optionally provided with pressurizing and depressurizing means, for building up the pressure inside the reactor vessel. In case one movable piston element is used, the other plugging element at the opposed side is rigidly connected to the vessel at its opening. Usually a liquid medium, such as for instance water, is used inside the reactor for attaining the high isostatic pressures. The sample to be subjected to the high pressure is placed in the liquid medium, after which the liquid medium is compressed, thereby subjecting the sample to isostatic pressure.

The available high pressure reactors have a limitation in that stainless steel starts to flow at pressures above 5,000 bar. Thus, at pressures above 5,000 bar additional, expensive, measures are normally necessary. Furthermore, the resistance of stainless steel against rapid, large pressure changes is not optimal. The present invention aims to overcome these disadvantages and aims to provide a reactor which requires less material in terms of weight, whilst being at least equally strong as stainless steel reactors at a lower cost. A further object of the present invention is to provide a reactor, which can withstand isostatic pressures of up to 15,000 bar. It has been found that these and other objects can be attained by the use of certain fibers in the wall of a reactor vessel.

SUMMARY OF THE INVENTION

Accordingly, the present invention relates to a reactor vessel comprising:
(a) a cylindrically shaped, hollow core element as the inner wall, which element is open at both ends; and
(b) at least one layer of high performance fibers, preferably having a tensile strength of at least 100 MPa, arranged around the core element in a substantially circumferential orientation, wherein the fibers are embedded in a rigid polymeric or resinous matrix.

The cylindrically shaped core element to be used may be a liner, but may also be a fine-meshed or a large-meshed metallic netting. The metal to be used preferably is stainless steel. In a particularly preferred embodiment, however, the core element is a stainless steel liner. The thickness of such liner may vary between wide limits, but a thickness of from 5 mm to 10 cm, preferably from 5 mm to 3 cm, has been found particularly advantageous.

The inner diameter of the core element and hence of the reactor vessel will normally range from 10.0 cm up to 100.0 cm depending on the desired reactor volume, but smaller or larger diameters could also be used. An inner diameter of from 15.0 to 50.0 cm is most conveniently used. The inner height of the reactor may vary within wide limits, but suitably ranges from 50.0 cm to 200.0 cm, more suitably from 60.0 cm to 125.0 cm. Reactor volume, accordingly, suitably ranges from about 15.5 to about 6,000 liters, more suitably from about 40 to about 1,000 liters. A reactor volume of from 150 to 500 liters has been found to be particularly useful, mainly in view of ease of handling, process control and cost of construction material.

The high performance fibers, that may be used for the purpose of the present invention, include both organic and inorganic fibers and should have such stress/strain properties (particularly a sufficiently high tensile strength) that it is able to withstand the high radial forces exerted onto the walls of the reactor vessel as a result of the very high pressures applied. It will be appreciated that the exact tensile strength of the fibers to be used is determined by the pressure applied in the reactor and the number of layers and the type of fibers to be used. It has been found that the fibers used should preferably have a tensile strength of at least 500 MPa in order to be suitably applied. However, fibers having a tensile strength of at least 1 GPa are more preferred, whilst fibers having a tensile strength of 2 GPa or more are most preferably used. The fibers to be used should also have a high modulus, suitably of at least 5 GPa and more suitably of at least 25 GPa. A modulus of 60 GPa or more is most preferred. The fibers to be used should also have a relatively low elongation at break, i.e. they should not be too elastic. Suitably, the elongation at break of the fibers used should not exceed 5% and preferably is at most 3%. An elongation at break of 1.5% or less is most preferred.

Several high performance fibers may be used for the purpose of the present invention. In general, four main classes of suitable high performance fibers can be recognised: the (modified) carbon fibers, the rigid-rod polymeric fibers, the gel spun fibers and the vitreous fibers.

Carbon fibers are very suitably applied in at least one layer constituting the wall of the reactor vessel according to the present invention. The term carbon fiber as used herein refers to filamentary products composed of more than 90% carbon and having a filament diameter of 3–15 $\mu$m and more preferably 5–12 $\mu$m. Carbon fibers are normally produced via the pyrolysis of polyacrylonitrile (PAN), pitch or rayon. A specific category of carbon fibers are the graphite fibers having a three-dimensional graphite structure. The preferred carbon fibers are the PAN-based fibers, of which the high modulus PAN-grades having a tensile modulus of 350 to 480 GPa, a tensile strength of 1.7 to 4.7 GPa and an elongation at break of 0.4 to 1.4% and the ultra high modulus PAN-grades having a tensile modulus of 500 to 600 GPa, a tensile strength of 1.7 to 3.9 GPa and an elongation at break of 0.3 to 0.7% are most preferably applied.

The rigid-rod polymeric fibers include the lyotropic liquid crystalline polymers and the thermotropic liquid crystalline polymers. The first class is the most important and comprises the aramid fibers. Suitable and well known aramid fibers are those consisting of p-phenylene heterocyclic rigid-rod polymers like poly(p-phenylene-2,6-benzobisthiazole) and poly(p-phenylene-2,6-benzobisoxazole) and those consisting of benzimidazole polymers like poly(2,2'-(m-phenylene)-5,5'-bisbenzimidazole). Aramid fibers are commercially available, for instance under the trade name KEVLAR and NOMEX.

The gel spun fibers include the high performance polyethylene (HPPE) fibers manufactured by DSM and Allied Signal and sold under the trade names DYNEEMA and SPECTRA. These HPPE fibers are based on ultra high molecular weight polyethylene, i.e. polyethylene molecules having a weight average molecular weight of $1 \times 10^6$ or higher.

The vitreous fibers, finally, include the glass fibers and refractory ceramic fibers. These fibers are composed of glass which is in the vitreous state. In general, the vitreous state in glass in somewhat analogous to the amorphous state in polymers, but unlike organic polymers, it is not desirable to achieve the crystalline state in glass. Glass fibers are normally produced from glass-forming compounds like $SiO_2$ and $P_2O_5$ mixed with other intermediate oxides like $Al_2O_3$, $TiO_2$ or ZnO and modifiers like MgO, $Li_2O$, BaO, CaO, $Na_2O$ and $K_2O$. The purpose of these modifiers is to break down the $SiO_2$ network, so that molten glass has the proper viscosity characteristics to allow it to cool to the desired vitreous state. The refractory ceramic fibers are produced by using high percentages of $Al_2O_3$ (normally about 50%) in admixture with $SiO_2$ as such or modified with other oxides like $ZrO_2$ or by using Kaolin clay, which contains similarly high amounts of $Al_2O_3$.

The reactor vessel according to the present invention comprises at least one layer of high performance fiber, wounded around the inner core element in an essentially circumferential orientation. Various combinations of different layers are possible, depending on reactor volume and isostatic pressure to be applied. For each specific situation, separate strength calculations need to be made in order to determine the optimum combination of layers. It is considered within the normal skills of a person skilled in the art to carry out the required calculations for each situation. In a preferred embodiment of the present invention, however, the reactor vessel comprises as a first layer a layer of glass fiber and one or more further layers composed of other high performance fibers. In one suitable embodiment at least one layer of glass fiber and at least one layer of carbon fiber are wound around the core element in an essentially circumferential orientation. A configuration, wherein at least one layer of ceramic fibers is wound around the core element in an essentially circumferential orientation, is also suitably applied. Particularly preferred is a reactor vessel wall comprising around the core element a first layer of glass fiber, a second layer of aramid fiber and a third layer of carbon fiber. A configuration with a first layer of glass fiber and a second and third layer of carbon fiber can also be suitably applied.

The high performance fibers are embedded in a rigid polymeric or resinous matrix. The matrix must have a sufficient hardness or rigidity to be able to withstand ultra high pressures. Suitable matrix materials, then, include those materials comprising an epoxy resin, a polyimide, a polyether ketone and/or a polyether sulphone. These materials are all well known in the art and are known for their hardness.

In a most preferred embodiment, however, a matrix of epoxy resin is used. The epoxy resin to be used may be any epoxy resin capable of forming a matrix for the fibers used and is not critical to the present invention. Suitable epoxy resins, then, include the diglycidyl ethers of bisphenol A derived from bisphenol A and epichlorohydrin. The epoxy resin may be cured by the addition of a curing agent or hardener, such as the catalytic curing agents like Lewis acids (mostly complexes of boron trifluoride with amines or ethers) and Lewis bases (mostly tertiary amines) and the coreactive curing agents like polyamines, polyamides and polycarboxylic acids. The first type of curing agents initiate homopolymerization of the various epoxy-group containing molecules, whilst the coreactive curing agents react with said molecules to form networks.

The invention also relates to a high pressure reactor comprising the reactor vessel described hereinbefore and two plugging means arranged in the opposing open ends of the vessel, which plugging means are mounted on a common frame for balancing the forces exerted on the said plugging means.

The frame to be used is necessary for balancing the axial forces exerted onto the plugging means, when the reactor is in operation. The frame suitably comprises at least one tension rod, and preferably two tension rods oppositely arranged with the reactor vessel between them, arranged in axial direction of the reactor vessel and two beams rigidly connected thereto at the top part and at the bottom part in a substantially perpendicular angle, between which beams the reactor vessel is located. This implies that both plugging means are mounted onto the respective beams. Preferably, at least one of the plugging means is movably mounted with respect to the frame. In this way, pressure can be at least partly built up and released by moving the variably mounted plugging means away from respectively in the direction of the part of the frame (i.e. the beam) to which it is mounted. If both plugging means are variably mounted with respect to the frame pressurization and depressurization can be at least partly achieved by moving the plugging means towards each other respectively away from each other. It is, however, preferred that one plugging means is movably mounted with respect to the frame, whilst the other plugging means is rigidly mounted with respect to the frame.

The reactor can also be partially buried into the soil or countersunk in a concrete foundation. In that case, the frame consists of one or two tension rods, which are also fixed into the soil or concrete foundation, and one cross beam above the reactor to which the upper plugging means of the reactor is movably or rigidly mounted.

As the plugging means, any suitable means for effectively closing the reactor vessel so that it is liquid- and gastight, can be used. Stationary and movable piston means are particularly suitable for this purpose.

Pressurization of the reactor can be attained by moving the plugging means towards each other in case two movable plugging means are used or by moving the variably mounted plugging means away from that part of the frame to which it is mounted. Pressurization can also be attained by pumping liquid into the reactor vessel via an inlet in one of the plugging means. The plugging means should in this case be connected to the frame in such manner that they can withstand the pressure built up by adding the liquid. Dedicated pumps for pumping liquids under high pressures are commercially available and any of such pumps can in principle be used for the purpose of the present invention. A combination of one or two movable plugging means and liquid addition for pressurizing the reactor may also be applied. Depressurization can be attained by opposite measures, i.e. by increasing the distance between both plugging means and/or by releasing liquid from the reactor.

The invention also relates to a high pressure reactor system comprising at least two reactors as described hereinbefore, wherein pressure equilizing means are arranged between adjacent reactors. In this way pressurization and depressurization of the various reactors present in the reactor system can be integrated, which is beneficial from a viewpoint of process economics and energy efficiency. Means for pressurization and depressurization are the same as described above for a single reactor, except that one pump can be used for more than one reactor. For reasons of process control it has been found advantageous to apply more than one pump. In this way, namely, pressure control is optimal, which is very important with the high pressures envisaged. A very suitable configuration of the various reactors used in a high pressure reactor system is the configuration, wherein the reactors are arranged around a central tension rod, which is part of a common frame for balancing the axial forces exerted onto the plugging means of each reactor.

In a further aspect the present invention relates to a process for the manufacture of a reactor vessel as described hereinbefore, which process comprises the steps of:
(a) covering the hollow cylindrically shaped core element with a thin layer of rigid polymeric or resinous matrix material, preferably epoxy resin matrix material,
(b) winding an organic or inorganic fiber, which has been soaked with the matrix material, around the core element in an essentially circumferential orientation,
(c) optionally repeating step (b) with the same or with another fiber, and
(d) allowing the vessel wall to harden.

The invention, finally, relates to the use of a reactor or reactor system as described hereinbefore in a high pressure operation. The reactor and reactor system are particularly useful in operations, wherein pressures up to 15,000 bar are applied. The advantages of the reactor according to the present invention can be benefited from most evidently in operations requiring pressures between 4,000 and 15,000 bar, more preferably between 5,000 and 13,000 bar.

DESCRIPTION OF THE PREFERRED EMBODIMENTS

Figure 1:
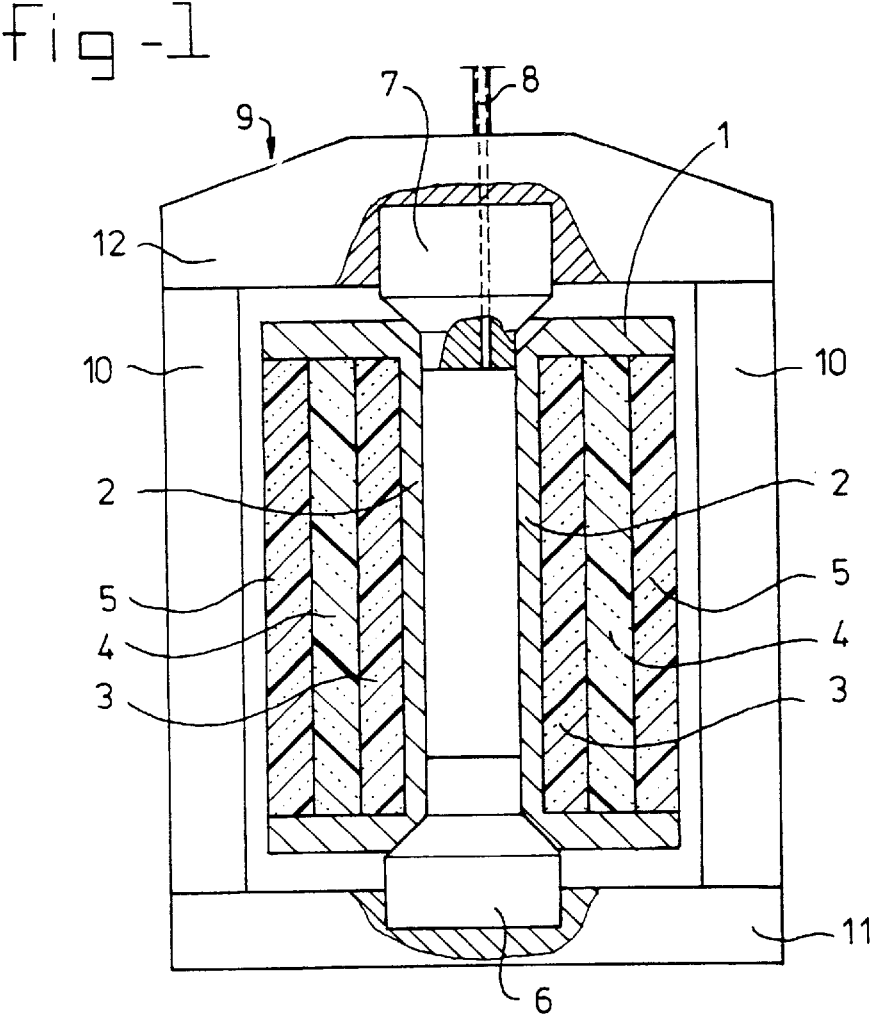
FIG. 1 schematically shows a side cross sectional view of a reactor according to the present invention.

In FIG. 1 a reactor vessel (1) comprises a stainless steel inner liner (2) covered by three layers (3), (4) and (5) of high performance fibers, which are successively wound around the liner (2) in essentially circumferential orientation. The glass fiber layer (3) is directly wound around the inner liner (2) followed by aramid fiber layer (4) and carbon fiber layer (5). All layers are embedded in an epoxy resin matrix (not shown). The reactor vessel (1) is closed by a stationary piston (6), which is rigidly mounted with respect to beam (11), and a movable piston (7), which is movably mounted with respect to beam (12). The piston (7) is also provided with a conduit (8) for introducing and releasing liquid, for pressurizing and depressurizing, respectively. The reactor further comprises a frame (9) comprising two tension rods (10), a lower cross beam (11) and an upper crossbeam (12).

Figure 2:
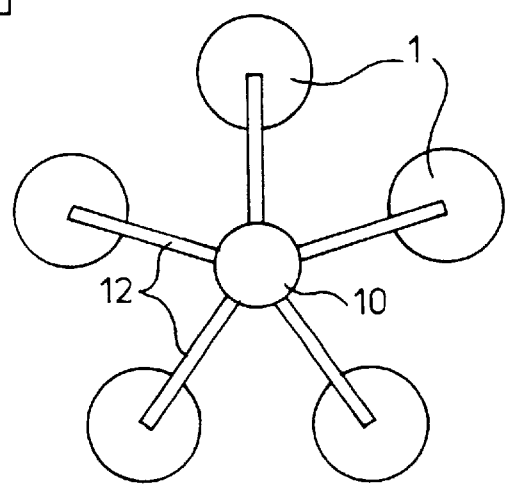
FIG. 2 is a schematic top view of a reactor system according to the present invention.

FIG. 2 shows a top view of a reactor system comprising five reactors (1), a central tension rod (10) and beams (12) connected to the upper plugging means of the reactors (1).

What is claimed is:
1. A reactor vessel comprising:
(a) a cylindrically shaped, hollow core element forming an inner wall, which hollow core element has two circular, open end faces having a diameter substantially equal to the diameter of the core element;
(b) two plugging means arranged in the opposing open ends of the vessel, which plugging means are mounted on a common frame for balancing the forces exerted on the plugging means, the frame comprising at least one tension rod arranged in an axial direction of the reactor vessel and two beams rigidly connected thereto at a top portion and a bottom portion at a substantially perpendicular angle, between which beams a reactor vessel is located; and
(c) at least one layer of high performance fibers arranged around the core element in a substantially circumferential orientation,
wherein the fibers are embedded in a rigid polymeric or resinous matrix.

2. The reactor vessel according to claim 1, wherein the core element is a stainless steel liner.

3. The reactor vessel according to claim 2, wherein at least one layer of glass fibers and at least one layer of carbon fibers are wound around the core element in a substantially circumferential orientation.

4. The reactor vessel according to claim 2, wherein at least one layer of ceramic fibers is wound around the core element in a substantially circumferential orientation.

5. The reactor vessel according to claim 2, wherein the rigid polymeric or resinous matrix comprises at least one of an epoxy resin, a polyimide, a polyether ketone and a polyether sulphone.

6. The reactor vessel according to claim 4, wherein the rigid polymeric or resinous matrix comprises at least one of an epoxy resin, a polyimide, a polyether ketone and a polyether sulphone.

7. The reactor vessel according to claim 1, wherein at least one layer of glass fibers and at least one layer of carbon fibers are wound around the core element in a substantially circumferential orientation.

8. The reactor according to claim 1, wherein at least one layer of ceramic fibers is wound around the core element in a substantially circumferential orientation.

9. The reactor vessel according to claim 8, wherein the rigid polymeric or resinous matrix comprises at least one of an epoxy resin, a polyimide, a polyether ketone and a polyether sulphone.

10. The reactor according to claim 1, wherein the rigid polymeric or resinous matrix comprises at least one of an epoxy resin, a polyimide, a polyether ketone and a polyether sulphone.

11. The reactor according to claim 1, wherein at least one of the plugging means is movably mounted with respect to the frame.

12. The reactor according to claim 11, wherein one plugging means is movably mounted with respect to the frame, whilst the other plugging means is rigidly mounted with respect to the frame.

13. A high pressure reactor system, comprising: at least two reactors according to claim 1, wherein pressure equalizing means are arranged between adjacent reactors and the reactors are arranged around a central tension rod.

14. The reactor vessel according to claim 1, wherein the high performance fibers have a tensile strength of at least 100 MPa.

15. The reactor vessel according to claim 1, wherein at least one of the plugging means is movably mounted with respect to the frame.

* * * * *